United States Patent
Reynolds et al.

(10) Patent No.: US 7,254,329 B2
(45) Date of Patent: Aug. 7, 2007

(54) METHOD AND SYSTEM FOR MULTI-INITIATOR SUPPORT TO STREAMING DEVICES IN A FIBRE CHANNEL NETWORK

(75) Inventors: Robert A. Reynolds, Pflugerville, TX (US); Keith M. Arroyo, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 376 days.

(21) Appl. No.: 10/794,975

(22) Filed: Mar. 5, 2004

(65) Prior Publication Data

US 2004/0170432 A1    Sep. 2, 2004

Related U.S. Application Data

(63) Continuation of application No. 09/317,800, filed on May 24, 1999, now abandoned.

(51) Int. Cl.
*H04B 10/00*    (2006.01)

(52) U.S. Cl. ............................................. 398/49; 398/53

(58) Field of Classification Search ................ 398/140, 398/49–57; 710/315, 5
See application file for complete search history.

(56) References Cited

U.S. PATENT DOCUMENTS

| | | | |
|---|---|---|---|
| 5,452,464 A | 9/1995 | Nomura et al. | |
| 5,519,695 A | 5/1996 | Purohit et al. | |
| 5,729,719 A | 3/1998 | Gates | |
| 5,742,792 A | 4/1998 | Yanai et al. | |
| 5,881,245 A | 3/1999 | Thompson | |
| 5,941,972 A | 8/1999 | Hoese et al. | |
| 6,065,087 A * | 5/2000 | Keaveny et al. | ............ 710/315 |
| 6,336,150 B1 * | 1/2002 | Ellis et al. | ...................... 710/5 |

OTHER PUBLICATIONS

Emerson, "Performance Evaluation of Switched Fibre Channel I/O System Using FCP for SCSI", IEEE Ancor Communications, pp. 479-484.

* cited by examiner

*Primary Examiner*—Agustin Bello
(74) *Attorney, Agent, or Firm*—Sprinkle IP Law Group

(57) ABSTRACT

A method and system are disclosed for processing multiple commands to a streaming target device through a SCSI router in a Fibre Channel network provisioned with one or more Fiber Channel hosts. The system and method are implemented in the SCSI router and include creating a FIFO queue, receiving a first command from one of the Fibre Channel hosts in the Fibre Channel network, and forwarding the first command to the streaming target device. When a subsequent command is issued to the streaming target device, the SCSI router can receive the subsequent command and determine whether the streaming target device has completed execution of the previous command. If the streaming target device has completed execution of the previous command, the subsequent command can be forwarded to the streaming target device. If the streaming target device has not completed executing the previous command, the subsequent command can instead be placed in the FIFO queue. Upon execution of the previous command by the streaming target device, the method of this invention can forward the subsequent command from the FIFO queue to the streaming target device. The method of this invention can repeat for any additional subsequent commands.

35 Claims, 2 Drawing Sheets

METHOD AND SYSTEM FOR MULTI-INITIATOR SUPPORT TO STREAMING DEVICES IN A FIBRE CHANNEL NETWORK

CROSS-REFERENCE TO RELATED APPLICATION

This application is a continuation of, and claims a benefit of priority under 35 U.S.C. 120 of the filing date of U.S. patent application Ser. No. 09/317,800 now abandoned by Reynolds, et al. entitled "METHOD AND SYSTEM FOR MULTI-INITIATOR SUPPORT TO STREAMING DEVICES IN A FIBRE CHANNEL NETWORK" filed on May 24, 1999, the entire contents of which are hereby expressly incorporated by reference for all purposes.

TECHNICAL FIELD OF THE INVENTION

The present invention relates generally to data and information communications systems and their operation, and more particularly to communications networks, including a Fibre Channel network. Even more particularly, the present invention relates to a Fibre Channel network system and method of operation having the ability to process multiple commands to a streaming device through a SCSI router for improving the management of inputs and outputs to improve network performance, eliminate communication failures, and avoid the loss of data that may occur as a result of multiple concurrent commands to a streaming device.

BACKGROUND OF THE INVENTION

In a Fibre Channel-to-SCSI router architecture, one SCSI initiator (interface), such as a SCSI router, can speak to SCSI targets on behalf of many Fibre Channel initiators (hosts). These Fibre Channel hosts can be attached to the SCSI router from many different interfaces. However, a SCSI target is only aware of the SCSI router interface connection to which it is directly attached. If two or more Fibre Channel hosts issue commands to the same target device, the target device sees all the commands as originating from the router. The target device is not aware of the individual Fibre Channel hosts.

In the SCSI architecture, a streaming target device, such as a tape backup device, is a target device that must complete execution of one command before another subsequent command from the same host can be recognized. A host issuing a subsequent command to a streaming target device that is still executing a prior command from the same host is issued a check condition (overlapped_cmd) response by the streaming target device. This can result in loss of the subsequent command and disruption of I/O transmissions. In a pure SCSI architecture, this is usually not a problem because in a normal situation, a host knows that once it has issued a command to a streaming target device, it cannot issue a subsequent command to the streaming target device until the earlier command has been fully executed. Moreover, in a multi-host SCSI environment, a streaming target device is able to differentiate, based on a SCSI ID, between commands issued to it by different hosts. If a streaming target device in a pure SCSI environment is currently executing a command from one host when another command from a different host is received, the streaming target device simply issues a reply to the second host indicating that it is busy. No disruption occurs, as would be the case if both commands were from the same host.

In a Fibre Channel-to-SCSI architecture, however, a SCSI router serves as the interface between the Fibre Channel portion of the network and the SCSI targets downstream of the router. The SCSI targets downstream of the SCSI router see the SCSI router as a single host originating all commands from any Fibre Channel hosts on the Fibre Channel portion of the network. As a result, a streaming target device receiving concurrent multiple commands from different Fibre Channel hosts through the SCSI router is not able to differentiate between Fibre Channel hosts and treats all the commands as originating from a single host. The streaming target device will therefore issue a check condition (overlapped_cmd) in response to any subsequent commands received while it is executing a prior command. The inability of current systems and methods to effectively process multiple concurrent commands to streaming target devices in a Fibre Channel network are thus particularly disruptive to network performance in a multi-host Fibre Channel-to-SCSI network architecture.

A streaming target device can be any device which is sequentially accessed, for example, some types of CD-ROMs, optical storage devices, and tape backups. When either the same host or, in the case of a multi-host Fibre Channel network, another host issues a command to a streaming target device before a prior command has completed execution, the second command is rejected, causing a decline in network performance and possible loss of data. Although normally the same host will not issue multiple concurrent commands to a streaming target device, in a multi-host Fibre Channel network environment, individual Fibre Channel hosts are unaware of the commands issued by the other hosts on the network to a particular streaming target device. Each host in the Fibre Channel network sees a target device as if it alone is speaking to the target device. As a result, a host on the network can unknowingly issue an overlapping command to a streaming target device executing a command from another host.

When a streaming target device receives a second command (or a third or fourth command) before completion of a prior command, it will cause a check condition (overlapped_cmd) response to issue to the host issuing the subsequent concurrent command. This can cause the host that issued the subsequent concurrent command(s) to go into error recovery. In particular, in a multi-host Fibre Channel network even an inquiry command (when a host first comes on-line or gets rebooted, it will issue an inquiry command on the network BUS to determine what other devices are on the network) can cause a disruption if the streaming target device is already executing a prior command.

The rejection of subsequent concurrent commands by a streaming target device can result in a loss of data. For example, many tape backup devices do not handle errors. If multiple commands from the same host are issued to such a tape backup device, it will abort the whole backup. Therefore, even a host coming on-line (or rebooting) that issues an inquiry command to determine what devices are on the network can cause a tape backup in progress to be aborted. This can result in corrupted or lost data and in disruption of I/Os between hosts and target devices. Because of the inability of current systems and methods to handle multiple concurrent commands to a streaming target device, some operations may have to be completely re-executed, and not simply restarted.

Additionally, although normally a host talking to a streaming target device will not issue overlapping commands, it is possible for a host to experience an error and issue multiple concurrent commands to a streaming target device. In such a case, the same disruptions in I/Os and possible corruption of data can occur.

SUMMARY OF THE INVENTION

Therefore, there is a need for a method and system that addresses the performance limitations arising in the known methods and systems for providing multi-initiator support to streaming target devices in a Fibre Channel network loop. In particular, a need exists for a method and system that processes multiple concurrent commands to a streaming target device without the decline in network performance and data loss problems occurring in known Fibre Channel-to-SCSI architecture command processing methods and systems.

A still further need exists for a method and system that avoids the general application failures that may occur in streaming target devices upon receipt of concurrent commands through a SCSI router from Fibre Channel hosts in a Fibre Channel network.

In accordance with the present invention, a system and method for processing multiple commands to a streaming target device through a SCSI router is provided that substantially eliminates or reduces disadvantages and problems associated with known such systems and methods, including the problems of limited network performance, loss of data in certain applications, and general application failures.

More specifically, the present invention provides a method and system for processing multiple commands to a streaming target device through a SCSI router in a Fibre Channel network provisioned with a plurality of Fiber Channel hosts. The method includes the step of, in the SCSI router, creating a FIFO queue, receiving a first command from one of the plurality of Fibre Channel hosts in the Fibre Channel network, and forwarding the first command to the streaming target device. The SCSI router can be any router that can serve as a Fibre Channel-to-SCSI interface in a Fibre Channel-to-SCSI architecture, such as a Crossroads Systems Inc., of Austin, Tex., Model 4100 or 4200 SCSI router. The Fibre Channel network may be a Fibre Channel arbitrated loop or switch network or other network topology.

The next step in the method is to process a subsequent command from either the same host that issued the previous (first) command or from another of the plurality of Fibre Channel hosts. This processing of the subsequent command involves the step of receiving the subsequent command in the SCSI router and determining whether the streaming target device has completed execution of the previous command. If the streaming target device has completed execution of the previous command, the method of this invention forwards the subsequent command to the streaming target device. If the streaming target device has not completed executing the previous command, the subsequent command can be placed in the FIFO queue. Upon completion of the previous command by the streaming target device, the subsequent command can be forwarded from the FIFO queue to the streaming target device.

The method of this invention further includes repeating the step of processing a subsequent command for any additional subsequent commands. Any number of additional subsequent commands to the streaming target device can be processed, limited at any given point in time only by the storage capacity of the FIFO queue.

The method for processing multiple commands to a streaming target device of the present invention can also be implemented in a Fibre Channel-to-SCSI network having more than one router. The method of this invention can provide separate FIFO queues for each streaming target device downstream of each SCSI router. In the event there are multiple streaming target devices connected to a given SCSI router, the method of this invention forwards each subsequent concurrent command for a particular streaming target device to the FIFO queue for that streaming target device. In this way, streaming target devices that have completed execution of a command need not wait for the execution of commands intended for other streaming target devices before their subsequent commands come up in a single queue. Separate queues for each streaming target device connected to a SCSI router can result in enhanced network performance.

As a technical advantage, the method of the present invention processes multiple concurrent commands to one or more streaming target devices through one or more SCSI routers without rejection and loss of subsequent commands and without forcing a Fibre Channel host that issued a subsequent command into error recovery mode. This technical advantage is particularly valuable in a Fibre Channel network having multiple hosts because a streaming target device in such a network is unable to distinguish between the multiple Fibre Channel hosts issuing commands and will reject any subsequent concurrent commands as originating from the same host.

Another technical advantage of the present invention is the capability of avoiding general application failures that may happen in streaming target devices and host devices upon receipt of concurrent commands.

A further technical advantage of the present invention is the capability of providing separate queues for each of multiple streaming target devices connected through a given SCSI router to the Fibre Channel network. In a Fibre Channel network having multiple streaming target devices connected to a SCSI router, maintaining a separate FIFO queue in the SCSI router for each streaming target device results in improved network performance. Separate FIFO queues provide decreased wait-state time between commands for each streaming target device.

A still further technical advantage of the present invention is the capability of providing improved multi-host network testing procedures. In a multi-host network, numerous hosts often operate simultaneously, or at least comparatively. In these networks, frequently maintenance of a host is needed for some reason or another. Taking down a host will generally affect all hosts on the network because once the host is placed back on-line or is rebooted, it will issue an inquiry command that could cause disruption of the I/Os between other hosts and a streaming target device if another command is already being executed by the streaming target device.

Still another technical advantage of the present invention relates to its ability to be made part of a Fibre Channel network with little additional cost. Generally, the method of the present invention may be implemented as a change in the instructions that control the processing of commands to a streaming target device in a Fibre Channel network. These changes may be implemented in a hardware protocol chip for controlling the protocol operations within the network. Even this modification may be done with relatively little expense.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Figure 1:
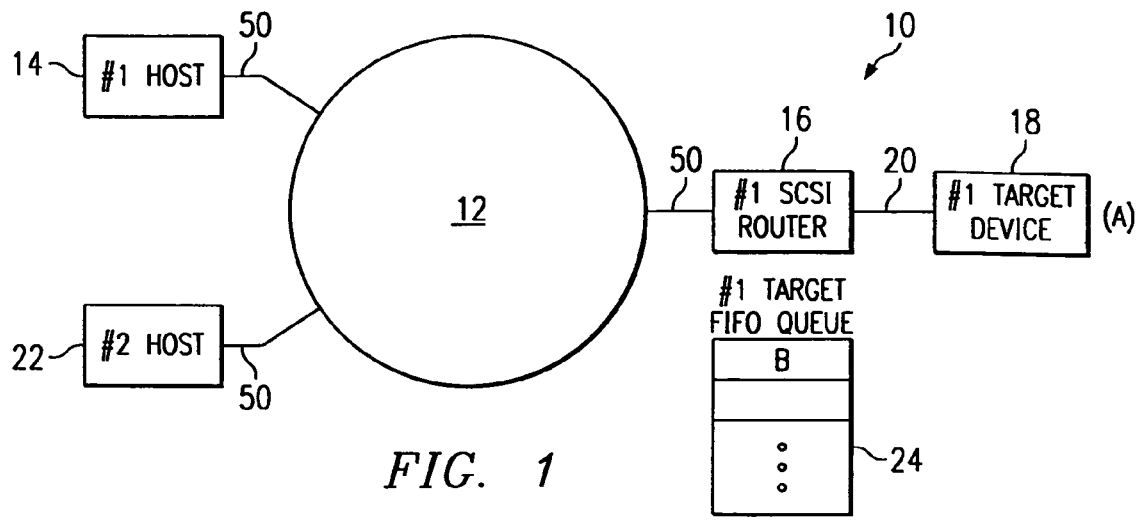
FIG. 1 illustrates a Fibre Channel network for incorporating the method for processing multiple commands to a streaming device through a SCSI router of the present invention.

Preferred embodiments of the present invention are illustrated in the FIGUREs, like numerals being used to refer to like and corresponding parts of various drawings.

The present invention maintains a FIFO (first in, first out) queue for each streaming target device connected downstream of a SCSI router, and, upon receiving concurrent commands for a streaming target device, can place each subsequent concurrent command into the FIFO queue until the command ahead of it has executed. The method and system of the present invention can provide for sequential execution of each command to a streaming target device without rejecting commands received while another command is executing. Instead of issuing a check condition (overlapped_cmd) response to a Fibre Channel host that issues a subsequent concurrent command to a streaming target device, the method of this invention can place each subsequent concurrent command into the FIFO queue and continue with the execution of a prior command without interruption. A Fibre Channel host that issues a command to a streaming target device currently executing a command from either the same Fibre Channel host or from another Fibre Channel host is therefore not forced into error recovery.

If a streaming target device is not executing a prior command when a command is received (i.e., it is idle), then the method of the present invention can simply forward the command to the streaming target device for execution. If a subsequent command arrives at the SCSI router for a streaming target device while the streaming target device is executing a prior command, the subsequent command (and any other subsequent commands that arrive while the streaming target device is executing a prior command), can be placed into the FIFO queue. Once the streaming target device has completed execution of the prior command, the first command in the FIFO queue can be forwarded by the SCSI router to the streaming target device for execution. This process can repeat itself for each additional subsequent command until the FIFO queue is empty.

If the FIFO queue is empty and the streaming target device is idle, a command that arrives at the SCSI router for the streaming target device can once again be simply forwarded to the streaming target device. The method of the present invention can maintain not only the functionality of each command received at the SCSI router for each streaming target device, but also the order of the commands, ensuring that each command is processed in the order received. By avoiding the check condition response of the prior art, the present invention can ensure that a Fibre Channel host that issues an overlapping command to a streaming target device is not forced into error recovery, forced to re-start, or forced to lose its functionality. The efficiency of the Fibre Channel network as a whole, and of a given Fibre Channel host in particular, can therefore be increased.

The method of the present invention is equally functional in a Fibre Channel network having more than one SCSI router, each of which can have multiple streaming target devices attached to and receiving commands from it. The method of the present invention is particularly useful for maintaining network efficiency and avoiding data loss and communications failures caused by the issuance of multiple concurrent commands to a streaming target device in a network comprised of multiple Fibre Channel hosts. Additionally, by maintaining in each SCSI router a separate FIFO queue for each streaming target device connected to the SCSI router, the method of the present invention can increase the efficiency of the network as a whole, and of each streaming target device and Fibre Channel host individually. This can be accomplished by forwarding to each streaming target device its next command from its own FIFO queue, independently of the other target device commands, and hence without undue delay. By allowing the processing of multiple commands to a streaming target device through a SCSI router without rejecting subsequent commands received while a prior command is executing, the method of the present invention can significantly improve the robustness of SCSI in a Fibre Channel environment.

In FIG. 1 there appears a conceptual diagram of Fibre Channel network 10 that includes network link 12 for connecting #1 host 14 and #2 host 22 with #1 SCSI router 16 via network links 50. #1 streaming target device 18 connects to #1 SCSI router 16 via SCSI network link 20. Network links 50 can be any Fibre Channel network connection and network link 20 can be any SCSI network connection.

According to the teaching of the present invention, #1 SCSI router 16 creates and contains #1 target FIFO queue 24. In the event that #1 streaming target device 18 is executing a command when a subsequent command from either #1 host 14 or #2 host 22 arrives at #1 SCSI router 16, #1 target FIFO queue 24 can hold the command(s) in the order received for execution by #1 streaming target device 18. For example, if #1 host 14 issues command "A" to #1 streaming target device 18 while #1 streaming target device 18 is idle (not executing a command), #1 SCSI router 16 can simply forward command "A" to #1 streaming target device 18 for execution. If while #1 streaming target device 18 is executing command "A" #2 host 22 issues a subsequent command "B" to #1 streaming target device 18, the method of this invention can hold command "B" in the FIFO queue until command "A" has been executed. #1 SCSI router 16, upon receiving command "B," determines that #1 streaming target device 18 is still executing command "A" and places command "B" into #1 target FIFO queue 24. When #1 streaming target device 18 completes execution of command "A," #1 SCSI router 16 can forward command "B" from #2 host 22 to #1 streaming target device 18 for execution. #1 target FIFO queue is left empty and ready to receive subsequent commands from #1 host 14 or #2 host 22 that may be issued while #1 streaming target device 18 is executing command "B." In such a situation, the method of this invention can repeat in the way described above.

The method for processing multiple commands to a streaming target device through a SCSI router of this invention is especially useful in the multi-host Fibre Channel network environment shown in FIG. 1. This is because, in a multi-host Fibre Channel network environment, each host perceives each target device as if it were there for its exclusive use. Although under normal operation a Fibre Channel host will not issue another command to a streaming target device until a prior command it issued has been executed, the hosts in a Fibre Channel network cannot detect the commands issued by any of the other hosts in that Fibre Channel network. Therefore, the hosts do not know to not issue a command to a streaming target device such as #1 streaming target device 18 while it is executing a command from one of the other hosts. In a multi-host Fibre Channel network environment, the method of the present invention can provide the capability for processing multiple commands to a streaming target device through a SCSI router without failures in communication, loss of data, or decrease in network performance.

Even in a single-host Fibre Channel network environment, the method of the present invention can still serve to improve network performance, prevent loss of data, and prevent communication failures. Under normal operation a Fibre Channel host will not issue a subsequent command to a streaming target device until a prior command it has issued is executed. However, it is possible for a Fibre Channel host to experience a fault, or to be in an error recovery situation, where a command it has issued times out and the Fibre Channel host re-issues the command. In such a case, the same Fibre Channel host ends up issuing concurrent commands to the streaming target device and can result in the streaming target device issuing a check condition (overlapped_cmd) response to the host. This can result in decreased network performance, communication failures, and possibly the loss of data by forcing the Fibre Channel host into error recovery mode.

Similarly, if an additional host is brought on-line or rebooted into the Fibre Channel network, the new host will usually issue an inquiry command to determine what other devices are on the Fibre Channel network. This inquiry command is like any other command to a streaming target device and can result in the same possible disruption of network performance, communication failures and possible data loss if received at a streaming target device that is executing a prior command. Without the method of the present invention, such a subsequent concurrent command can result in the loss of the subsequent command and reduction in network performance because the subsequent command can be rejected or an inappropriate response to the subsequent command can result.

Therefore, the method of the present invention provides, in either a single-host or a multi-host Fibre Channel network environment, the capability for processing multiple concurrent commands to a streaming target device or to multiple streaming target devices without rejection of the subsequent commands, loss of communications, loss of data, or reduction in network performance. Additionally, the method of the present invention can maintain the order of the commands as they were issued from the host to the streaming target device.

Figure 2:
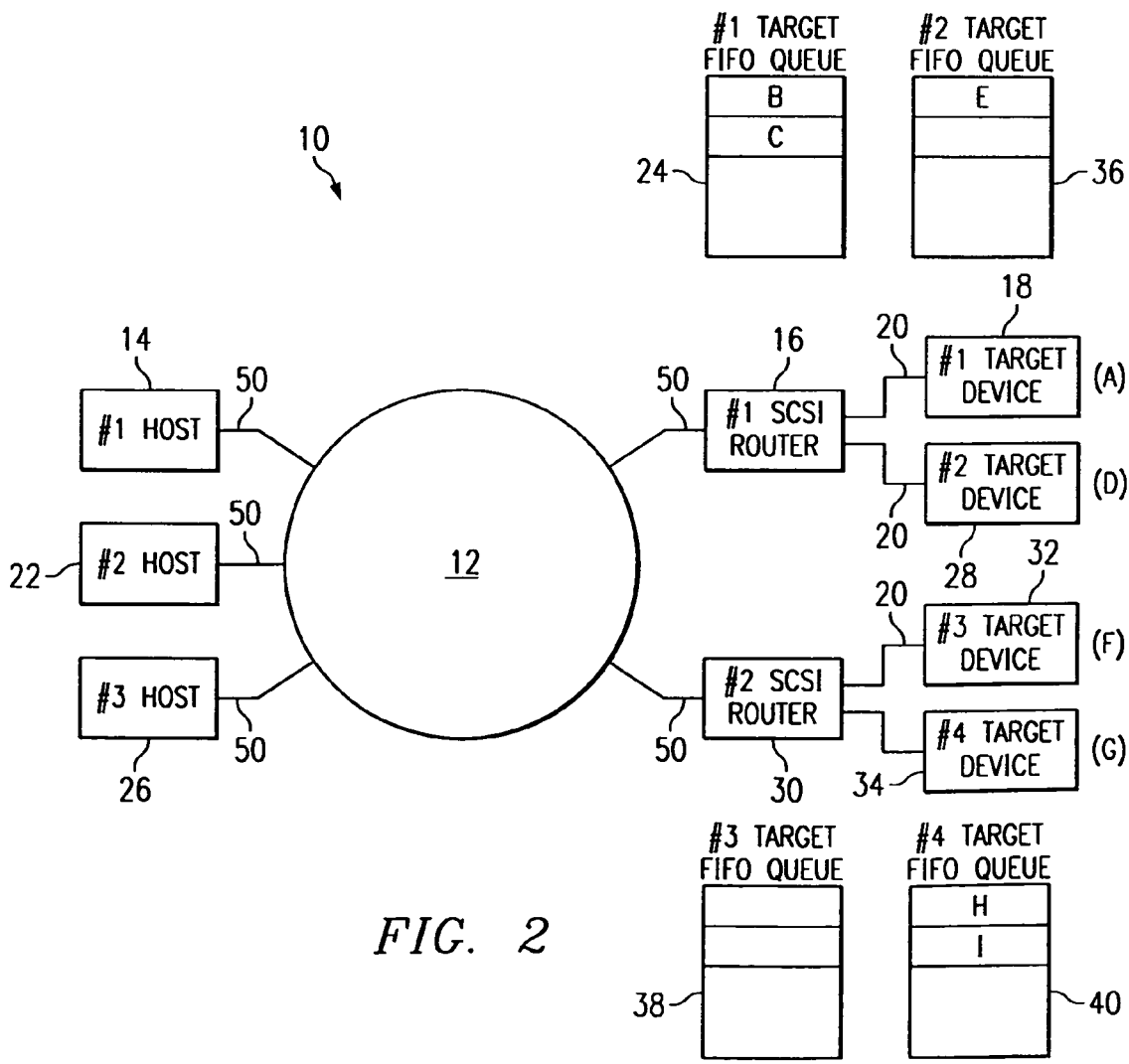
FIG. 2 illustrates the use of the present invention in a multi-host, multi-router and multi-streaming target device Fibre Channel network.

FIG. 2 shows a modified Fibre Channel network 10 demonstrating the capability of the present invention to process multiple concurrent commands from multiple Fibre Channel hosts to multiple SCSI routers, each having multiple streaming target devices. Fibre Channel network 10 now also includes #3 host 26 and #2 SCSI router 30 communicatively connected to Fibre Channel network link 12 via network links 50. Network links 50 can be any Fibre Channel network connection.

1 SCSI router 16 is communicatively connected to #1 streaming target device 18 and #2 streaming target device 28 via network links 20. #2 SCSI router 30 is communicatively connected to #3 streaming target device 32 and #4 streaming target device 34 via network links 20. As shown in FIG. 2, #1 and #2 SCSI routers 16 and 30 each contain separate FIFO queues for each of the streaming target devices which they connect to the Fibre Channel network: #1 target FIFO queue 24 corresponds to #1 streaming target device 18, #2 target FIFO queue 36 corresponds to #2 streaming target device 28, #3 target FIFO queue 38 corresponds to #3 streaming target device 32 and #4 target FIFO queue corresponds to #4 streaming target device 34. Target FIFO queues 24, 36, 38 and 40 can be created and maintained within their respective SCSI routers.

FIG. 2 shows #1 streaming target device 18 executing command "A" from #1 host 14. Additionally, #2 host 22 and #3 host 26 have issued commands "B" and "C", respectively, to #1 streaming target device 18. According to the teachings of the method of the present invention, commands "B" and "C" can be held in #1 target FIFO queue 24 to be executed by #1 streaming target device 18 in the order received once command "A" has been executed. Similarly, #2 streaming target device 28 is shown executing command "D" from #1 host 14. #2 streaming target device 28 has also been issued command "E" by #3 host 26. Command "E" has been placed in #2 target FIFO queue 36 by #1 SCSI router 16. Command "E" can be released from #2 target FIFO queue 36 by #1 SCSI router 16 to be executed by #2 target device 28 once command "D" is executed.

In a similar fashion, #3 streaming target device 32 has been issued and is executing command "F". #3 streaming target device has no other outstanding concurrent commands and therefore #3 target FIFO queue 38 is empty. #4 streaming target device 34 has been issued command "G" by #2 host 22 and is shown executing command "G". #4 streaming target device 34 has also been issued, in order, commands "H" and "I" by #1 host 14 and #3 host 26, respectively. #2 SCSI router 30 has placed commands "H" and "I" in #4 target FIFO queue 40 to await execution of command "G" by #4 streaming target device 34. When command "G" has been executed by #4 streaming target device 34, commands "H" and "I" can be released to #4 streaming target device 34 to be executed.

While FIG. 2 shows a closed, complete Fibre Channel network 10, it is possible to add both SCSI routers and hosts to Fibre Channel network 10. If additional hosts are added (or existing hosts are rebooted) to Fibre Channel network 10, the new hosts may issue an inquiry command to determine what other devices are present on Fibre Channel network 10. In such a case, the method for processing multiple concurrent commands to a streaming device through a SCSI router of the present invention can simply process the inquiry commands in the same manner as any other command.

The method of the present invention can function equally well with multiple hosts, multiple SCSI routers and multiple streaming target devices. The number of SCSI routers, streaming target devices and hosts is limited only by SCSI router and network capacity. Similarly, #1 target FIFO queue 24, #2 target FIFO queue 36, #3 target FIFO queue 38 and #4 target FIFO queue 40 can be dynamically changing queues whose size varies depending on the number of concurrent commands issued to their respective streaming target devices. The size of target FIFO queues 24, 36, 38 and 40 is limited only by router capacity.

Figure 3:
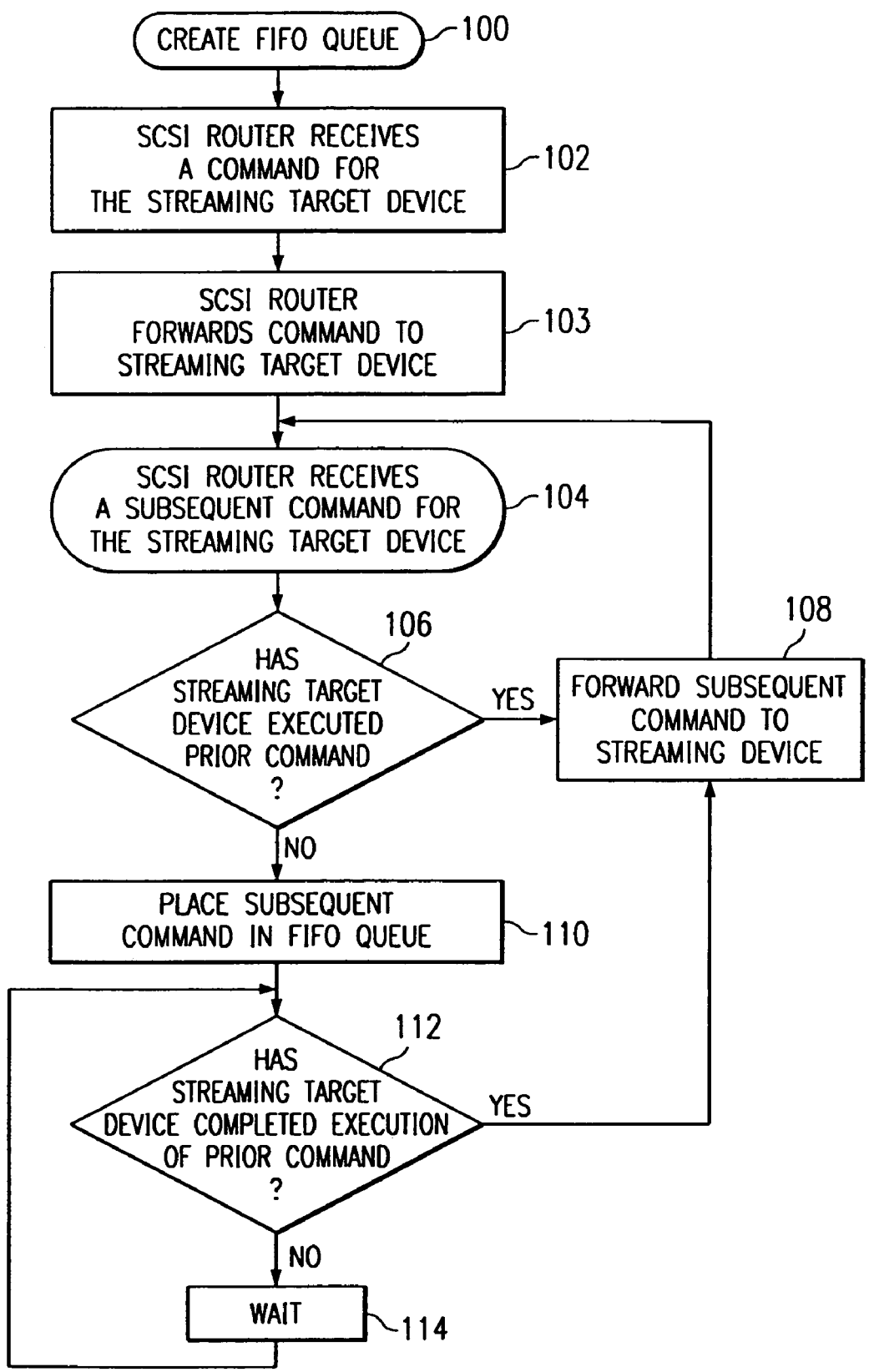
FIG. 3 shows a flow chart of one embodiment of the operational steps according to the teaching of the present invention.

FIG. 3 is a flow chart diagramming the overall operation of the method for processing multiple concurrent commands to a streaming device through a SCSI router of the present invention. At Step 100 of FIG. 3, the method of the present invention creates a FIFO queue in a SCSI router, such as #1

SCSI router 16 of FIG. 1. In Step 102, #1 SCSI router 16 receives a command for a streaming target device, such as #1 streaming target device 18 of FIG. 1, from a Fibre Channel host, such as #1 host 14. At Step 103, #1 SCSI router 16 can forward the command received from #1 host 14 to #1 streaming target device 18, if there are no other commands outstanding to #1 streaming target device 18. At Step 104, #1 SCSI router 16 receives a subsequent command for #1 streaming target device 18 from either #1 host 14 (which issued the first command) or from another Fibre Channel host, such as #2 host 22, on the Fibre Channel network. At Step 106, the method of the present invention can determine if #1 streaming target device 18 has completed execution of the first command. If #1 streaming target device 18 has completed execution of the first command, the method of the present invention can forward, at Step 108, the subsequent command to #1 streaming target device 18 to be executed.

The method of the present invention can now take two paths. First, the method of the present invention can receive additional subsequent commands for #1 streaming target device 18 at Step 104. In the event that the first (or a prior) subsequent command to #1 streaming target device 18 has already been forwarded at Step 108, the method of the present invention can simply wait to receive any additional subsequent commands and repeat for those subsequent commands. Note, however, that the method of the present invention can always be ready to receive additional subsequent commands, and not just after forwarding a prior command.

Second, if at Step 106 the method of the present invention determines that #1 streaming target device 18 has not completed execution of the first command, then at Step 110 the first subsequent command can be placed in the FIFO queue. At Step 112, the method again asks itself if #1 streaming target device 18 has completed execution of the prior (first) command. If the answer is again no, the method of the present invention waits at Step 114 and asks itself the question again by retracing to Step 112. Once #1 streaming target device 18 has completed execution of the prior command, the method of the present invention can forward the next subsequent command in the FIFO queue to #1 streaming target device 18 at Step 108. The method of the present invention can repeat continuously as additional subsequent commands are received by #1 SCSI router 16 for #1 streaming target device 18.

FIG. 3 diagrams the overall operation of the method for processing multiple concurrent commands of the present invention in the case of a single SCSI router and a single streaming target device. However, the method of the present invention is equally applicable to multiple SCSI router, multiple streaming target device and multiple Fibre Channel host Fibre Channel networks.

Although the present invention has been described in detail herein with reference to the illustrated embodiments, it should be understood that the description is by way of example only and is not to be construed in a limiting sense. It is to be further understood, therefore that numerous changes in the details of the embodiment of this invention and additional embodiments of this invention will be apparent to, and may be made by, persons of ordinary skill in the art having reference to this description. It is contemplated that all such changes and additional embodiments are within the spirit and true scope of the invention as claimed below.

What is claimed is:

1. A method for processing multiple commands to a streaming target device through a SCSI router in a Fibre Channel network having a plurality of Fibre Channel hosts, comprising the steps of, in the SCSI router:

creating a FIFO queue;

receiving a first command from one of the plurality of Fibre Channel hosts and forwarding the first command to the streaming target device;

processing a subsequent command from one of either said one of the plurality of Fibre Channel hosts or from one of other ones of the plurality of Fibre Channel hosts, comprising:

(a) receiving the subsequent command in the SCSI router;

(b) determining whether the streaming target device has completed execution of the first command;

(c) if the streaming target device has completed execution of the first command, forwarding the subsequent command to the streaming target device;

(d) if the streaming target device has not completed executing the first command, placing the subsequent command in the FIFO queue; and (e) forwarding the subsequent command from the FIFO queue to the streaming target device upon completion of the first command by the streaming target device; and repeating the step of processing the subsequent command from one of either said one of the plurality of Fibre Channel hosts or said one of other ones of the plurality of the second Fibre Channel hosts for at least one additional subsequent command, wherein the subsequent command is the first command and the at least one additional subsequent command is the subsequent command.

2. The method of claim 1, wherein the Fibre Channel network further comprises a single Fibre Channel host and wherein said step of processing a subsequent command comprises processing a subsequent command from the single Fibre Channel host.

3. The method of claim 1, wherein the subsequent command is received from said one of the plurality of Fibre Channel hosts that issued the first command.

4. The method of claim 1, wherein the Fibre Channel network further comprises a plurality of SCSI routers.

5. The method of claim 4, wherein each of the plurality of SCSI routers has at least one streaming target device connected to and receiving commands from said each of the plurality of SCSI routers.

6. The method of claim 5, further comprising the step of creating a separate FIFO queue in said each of the plurality of SCSI routers for each of the at least one streaming target devices connected to said each of the plurality of SCSI routers.

7. The method of claim 1, further comprising the step of making the streaming target device a tape backup device.

8. The method of claim 1, further comprising the step of making the streaming target device an optical device.

9. A system for processing multiple commands to a streaming target device through a SCSI router in a Fibre Channel network having a plurality of Fibre Channel hosts, comprising:

instructions for creating a FIFO queue in the SCSI router;

instructions for receiving in the SCSI router a first command from one of the plurality of Fibre Channel hosts and for forwarding the first command to the streaming target device;

instructions for processing in the SCSI router a subsequent command from one of either said one of the plurality of Fibre Channel hosts or from one of other ones of the plurality of Fibre Channel hosts, further comprising:
(a) instructions for receiving the subsequent command in the SCSI router;
(b) instructions for determining whether the streaming target device has completed execution of the first command;
(c) if the streaming target device has completed execution of the first command, instructions for forwarding the subsequent command to the streaming target device;
(d) if the streaming target device has not executed the first command, instructions for placing the subsequent command in the FIFO queue; and
(e) instructions for forwarding the subsequent command from the FIFO queue to the streaming target device upon execution of the first command by the streaming target device; and
instructions for repeating the step of processing the subsequent command from one of either said one of the plurality of Fibre Channel hosts or said one of other ones of the plurality of Fibre Channel hosts for at least one additional subsequent command, wherein the subsequent command is the first command and the at least one additional subsequent command is the subsequent command.

10. The system of claim 9, wherein the Fibre Channel network further comprises a single Fibre Channel host and wherein the instructions for processing a subsequent command comprise processing a subsequent command from the single Fibre Channel host.

11. The system of claim 9, wherein the subsequent command is received from said one of the plurality of Fibre Channel hosts that issued the first command.

12. The system of claim 9, wherein the Fibre Channel network further comprises a plurality of SCSI routers.

13. The system of claim 12, wherein each of the plurality of SCSI routers has at least one streaming target device connected to and receiving commands from said each of the plurality of SCSI routers.

14. The system of claim 13, further comprising a separate FIFO queue in said each of the plurality of SCSI routers for each of the at least one streaming target devices connected to said each of the plurality of SCSI routers.

15. The system of claim 9, wherein the streaming target device is a tape backup device.

16. The system of claim 9, wherein the streaming target device is an optical device.

17. A method for processing commands to a streaming target device through a first router in a network having one or more hosts including a first host, wherein the one or more hosts are capable of communicating in a first protocol, and the streaming target device is capable of communicating using a second protocol different from the first protocol, and wherein, within the first router, the method comprises:
receiving a first command from the first host and forwarding the first command to the streaming target device;
processing a subsequent command from the first host or a different host, wherein processing the subsequent command comprises:
receiving the subsequent command in the router;
determining whether the streaming target device has completed execution of the first command;
if the streaming target device has completed execution of the first command, forwarding the subsequent command to the streaming target device;
if the streaming target device has not completed executing the first command, placing the subsequent command in a FIFO queue; and
forwarding the subsequent command from the FIFO queue to the streaming target device upon completion of the first command by the streaming target device.

18. The method of claim 17, wherein the network comprises only a single host, which is the first host.

19. The method of claim 17, wherein the subsequent command or the additional subsequent command is received from the different host.

20. The method of claim 17, wherein the network comprises a plurality of routers including the first router.

21. The method of claim 20, wherein each of the plurality of routers has at least one corresponding streaming target device connected to and capable of receiving commands from said each of the plurality of routers.

22. The method of claim 21, further comprising maintaining a separate FIFO queue in said each of the plurality of routers for its corresponding streaming target device.

23. The method of claim 17, wherein the streaming target device is a tape backup device.

24. The method of claim 17, wherein the streaming target device is an optical device.

25. The method of claim 17, wherein the first protocol is Fibre Channel and the second protocol is a SCSI protocol.

26. The method of claim 17, further comprising repeating processing the subsequent command for an additional subsequent command, wherein the subsequent command is treated as the first command and the additional subsequent command is treated as the subsequent command.

27. A computer readable medium having code embedded therein for enabling a system for processing commands to a streaming target device through a first router in a network having a one or more hosts including a first host, wherein the one or more hosts are capable of communicating using a first protocol, and the steaming target device is capable of communicating using a second protocol different from the first protocol, the code comprising:
instructions for forwarding a first command to the streaming target device after receiving in the first router the first command from the first host;
instructions for processing in the first router a subsequent command from the first host or a different host, wherein the instructions for processing the subsequent command further comprise:
instructions for receiving the subsequent command in the first router;
instructions for determining whether the streaming target device has completed execution of the first command;
if the streaming target device has completed execution of the first command, instructions for forwarding the subsequent command to the streaming target device;
if the streaming target device has not executed the first command, instructions for placing the subsequent command in a FIFO queue; and
instructions for forwarding the subsequent command from the FIFO queue to the streaming target device upon execution of the first command by the streaming target device; and
instructions for repeating processing the subsequent command for an additional subsequent command, wherein the subsequent command is treated as the first command and the additional subsequent command is treated as the subsequent command.

28. The computer readable medium of claim 27, wherein the network comprises only a single host, which is the first host.

29. The computer readable medium of claim 27, wherein the instructions for processing the subsequent command or the additional subsequent command are received from the different host.

30. The computer readable medium of claim 27, wherein the network comprises a plurality of routers including the first router.

31. The computer readable medium of claim 30, wherein each of the plurality of routers has at least one corresponding streaming target device connected to and capable of receiving commands from said each of the plurality of routers.

32. The computer readable medium of claim 31, wherein the system further comprises a separate FIFO queue in said each of the plurality of routers for its corresponding streaming target device.

33. The computer readable medium of claim 27, wherein the streaming target device is a tape backup device.

34. The computer readable medium of claim 27, wherein the streaming target device is an optical device.

35. The computer readable medium of claim 27, wherein the first protocol is Fibre Channel and the second protocol is a SCSI protocol.

* * * * *